April 8, 1930.  J. H. PHILLIPS  1,753,427
WADING TANK
Filed Aug. 26, 1927  2 Sheets-Sheet 1
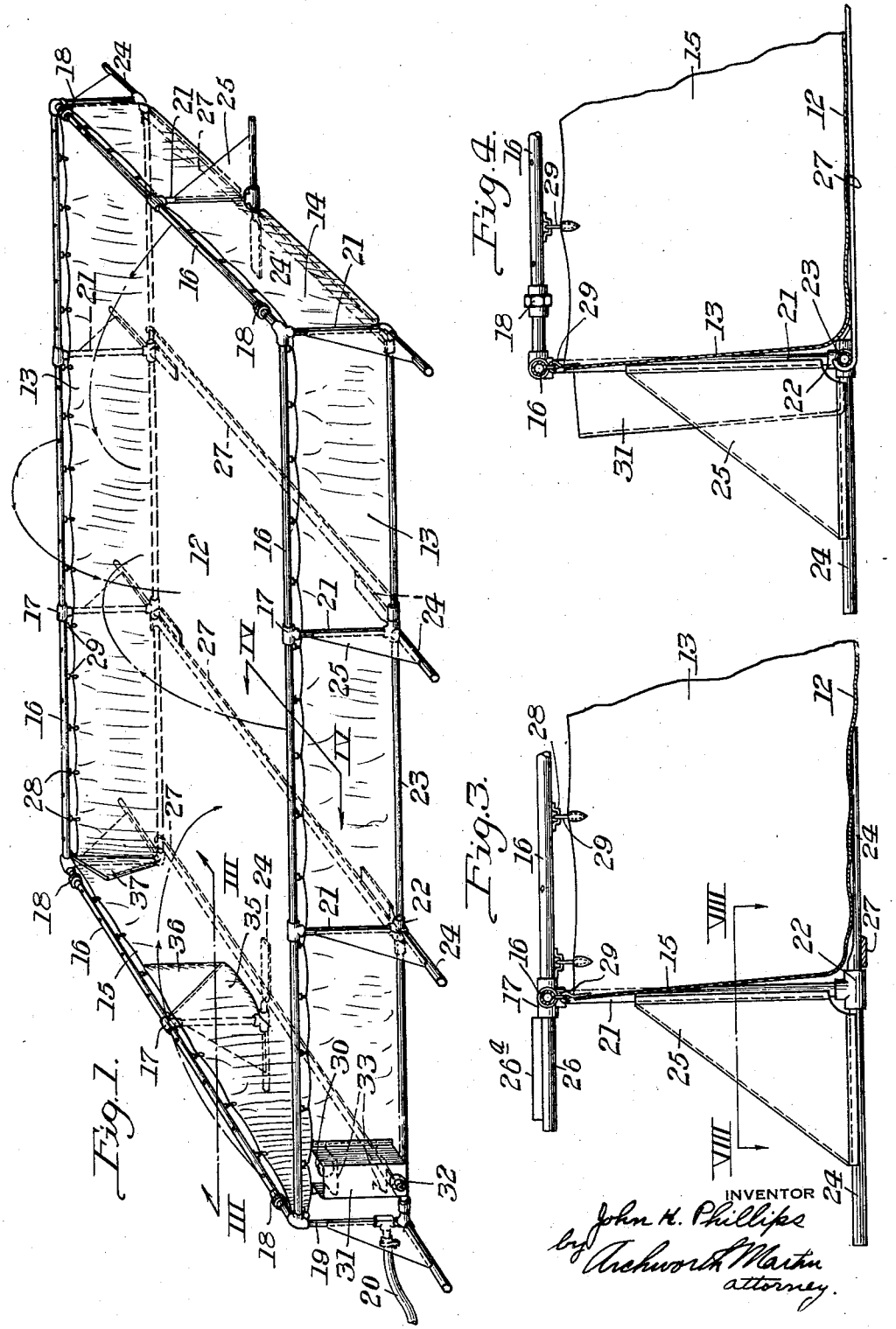
INVENTOR
John H. Phillips
by Archworth Martin
attorney.

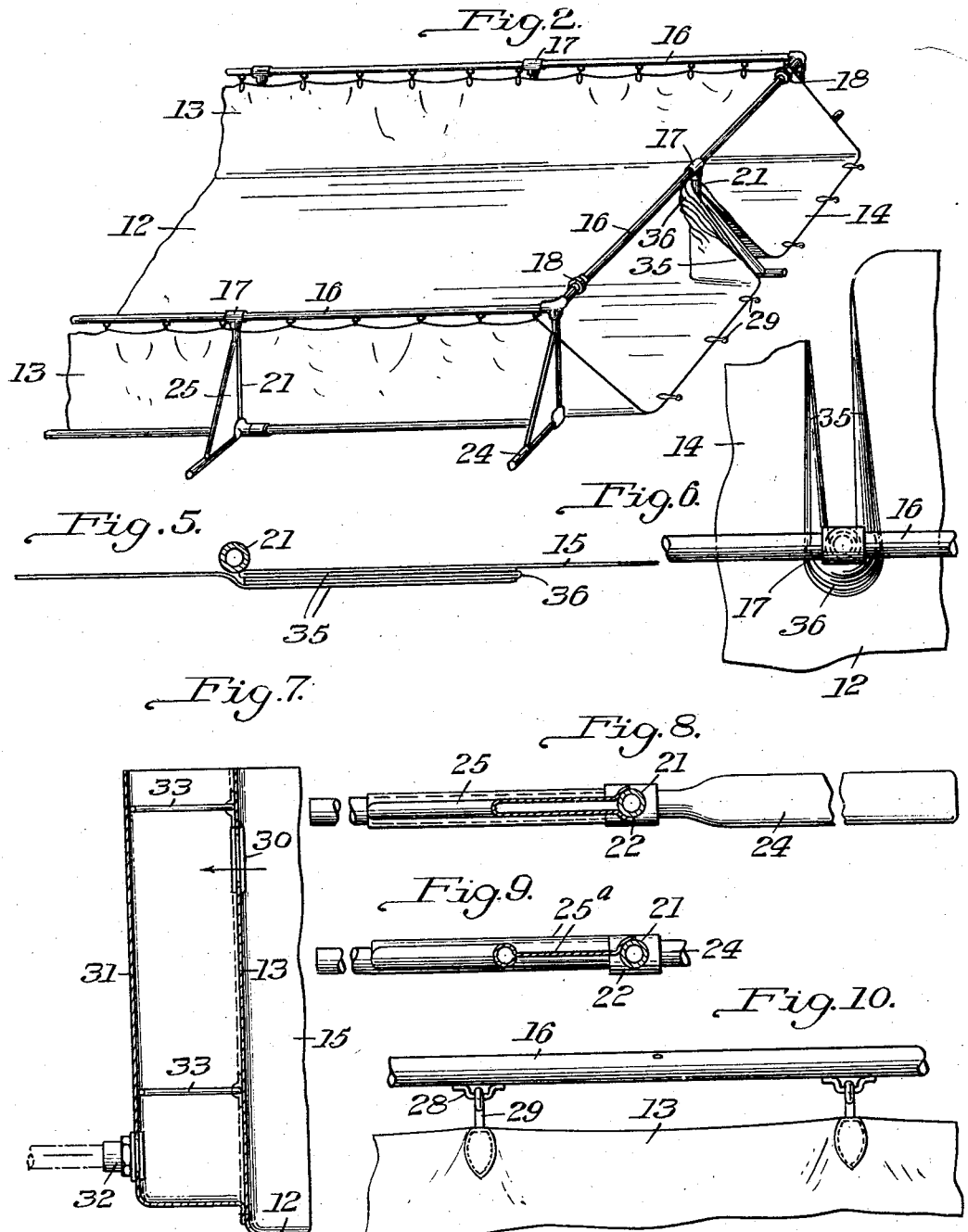

Patented Apr. 8, 1930

1,753,427

UNITED STATES PATENT OFFICE

JOHN H. PHILLIPS, OF PITTSBURGH, PENNSYLVANIA

WADING TANK

Application filed August 26, 1927. Serial No. 215,584.

My invention relates to tanks that are especially suitable for employment as wading and swimming pools.

One object of my invention is to provide a tank of the knock-down type that is conveniently portable.

Another object of my invention is to provide a tank of such form that standard pipe sections and canvas or other water-proof material may be largely employed in its manufacture.

Still another object of my invention is to provide a tank structure wherein spraying pipes are employed that also serve as part of the framework for supporting the container for the water.

Another object of my invention is to provide a tank structure that may be readily cleaned and flushed.

Still another object of my invention is to simplify and improve generally the structure and arrangement of devices of the character referred to.

One form which my invention may take is shown in the accompanying drawing, wherein Figure 1 is a perspective view; Fig. 2 is a perspective view of a portion of the apparatus of Fig. 1, and showing the end wall of the tank in open position; Fig. 3 is a view taken on the line III—III of Fig. 1, but on an enlarged scale, and slightly modified; Fig. 4 is a view taken on the line IV—IV of Fig. 1, on an enlarged scale; Fig. 5 is an enlarged plan view of a portion of one of the end walls of Fig. 1; Fig. 6 is a plan view of a portion of the end wall of Fig. 2, on an enlarged scale; Fig. 7 is a sectional elevational view, on an enlarged scale, of the overflow compartment of Fig. 1; Fig. 8 is a view taken on the line VIII—VIII of Fig. 3; Fig. 9 is a similar view showing a modification of the brace plate of Fig. 8, and Fig. 10 is an enlarged detail view of a portion of one of the spray pipes, showing the manner in which the canvas wall is secured thereto.

The tank proper is composed of canvas or other water-proof material having a bottom wall 12, side walls 13 and end walls 14 and 15, the various portions of the canvas body being sewed or otherwise secured together.

The framework for supporting the canvas body includes pipe sections 16 connected together by suitable coupling members such as T sections 17 and pipe unions 18, or right and left threaded pipe sections, the unions or right and left threaded pipe sections serving as a means whereby the pipe sections can be conveniently connected and dis-connected. The pipe sections 16 are perforated to serve as spray pipes, or perforations can be tapped therein to permit screwing of special spray heads into the same, the perforations being directed inwardly so that the water will fall into the tank or upon the users thereof. Water under pressure is supplied to the pipes 16 through a pipe 19 that has connection with a hose 20 which leads to any suitable source of supply (not shown) such as a fire plug.

The spray pipes 16 are supported by vertical pipe sections 21, distributed at suitable distances around the tank and screw-threaded into the lower branches of the T sections 17, the lower end of the uprights 21 being screwed into coupling members 22.

The bottom frame members 23 which may also be in the form of pipe sections are screwed into the ends of the connections 22, which may be in the form of ordinary cross sections. If desired, closed fittings can be used which will shut water from all of the pipes except the top pipe 16 and the pipe 19 which carries the supply hose connection.

A series of brace members 24 are provided to afford stability to the framework, such brace members lying upon the ground or pavement, and consisting of pipe sections that are flattened and spread at their inner ends, as shown in Figs. 1 and 8, so that they will not cause the canvas to bulge upwardly and present an obstruction to the feet of waders, and so that the weight of the water in the tank will bear upon the same and lend stability to the framework. The brace bars 24 are secured to the framework by brace plates 25, whose vertical and horizontal edges are welded to the uprights 21 and the brace bars 24, respectively. These brace plates may be either of the form shown in Fig. 8 or of the form indicated by the reference numeral 25ª in Fig. 9, it being desirable to avoid projections and sharp corners as much as possible. In order to form supporting members for a seat around the tank, at the sides, the brace member 25 can be extended upwardly, or side outlet T fittings can be used at 17 (Fig. 3) to receive a nipple 26 upon which a seat 26ª can be placed.

In order to prevent spreading of the sides of the frame under pressure of the walls 13, I provide tie bars 27 that are preferably flat, and whose ends are in the forms of hooks that engage the frame members 23

As shown more clearly in Fig. 10, eyes or loops 28 are welded or otherwise secured to the spray pipe 16, so that the upper edges of the canvas body can be detachably connected thereto as by means of snap hooks 29 that are secured to the canvas.

The canvas body is provided at one corner with an overflow opening 30 (Figs. 1 and 7) through which surplus water may flow into an overflow bag or pocket 31 that has an outlet 32 near its bottom, through which the water flows away, and to which a hose may be connected, if it is desired to avoid waste of such water and utilize it as for watering a lawn or plants. Loop-like brace members 33 of wire are pivotally connected to the wall of the tank and may be folded against the wall thereof, to permit the compartment 31 to be collapsed when the tank is not in use.

The end walls 14 and 15 of the tank can be so formed that they may be let down as shown in Fig. 2, to permit flushing of the tank. Such wall is normally held in its raised position by means of snap hooks as shown in Figs. 9 and 10, but these hooks may be dis-engaged to permit lowering of the wall, the wall being provided with a fold 35 of surplus material near its mid portion as shown more clearly in Fig. 1 to permit it to be dropped to horizontal position as shown in Fig. 2, without interference by the upright 21. In its ordinary form, the fold 35 will permit water to flow from the tank at a comparatively low level, and to seal it against such flow, I secure thereto a gore-like extension 36, as shown in Fig. 1, that extends above the normal level of water in the tank. The corner folds 37 of the canvas can be similarly provided with extensions in order to maintain the desired water level in the tank.

I claim as my invention:—

1. Tank structure comprising a flexible body portion, a framework therefor composed of pipe sections detachably connected, and means for detachably securing the said body portion to the framework, the framework extending from a plane above the upper edges of the body portions downwardly along the outer sides thereof.

2. Tank structure comprising a flexible body portion, a framework disposed adjacent to the upper edge and exteriorly thereof and composed of conduit members having spray perforations, a framework disposed exteriorly of and adjacent to the bottom of the said body, and means for detachably connecting the upper and lower frame members together.

3. Tank structure comprising a flexible body member, having an overflow opening, a framework for supporting said member, a compartment of flexible material adjacent to said opening for receiving overflowing water, a pivoted brace member for releasably supporting the compartment in expanded position, and means at the lower end of said compartment for directing the water therefrom.

4. Tank structure comprising a flexible body member having vertical walls, frame members for supporting said walls, and arms connected to and extending horizontally from one of the frame members, to support a seat above the sides of the tank structure.

5. Tank structure comprising a flexible body member having vertical walls, frame members for supporting said walls, and a seat member connected to the frame members.

6. Tank structure comprising a framework disposed in a generally horizontal plane and a portion thereof serving as a conduit and having inwardly-directed spray openings, means for supporting the framework in an elevated position, and a flexible body member having the upper edges of its vertical walls detachably connected to and suspended from the frame work.

7. Tank structure comprising a framework disposed in a generally horizontal plane and a portion thereof serving as a conduit and having inwardly-directed spray openings, means for supporting the framework in an elevated position, and a flexible body member having the upper edges of its vertical walls extending downwardly from the undersides of the frame members and in vertical alinement therewith.

8. Tank structure comprising a flexible body member having vertical walls, framework for supporting said walls, and a seat-supporting member extending outwardly from one of the frame members, in position to support a seat in a plane above the upper edge of the body member.

9. Tank structure comprising a flexible body member having an overflow opening, a framework for supporting said member, a compartment of flexible material secured to the body member in position to receive flow through said opening, and a brace member pivotally connected to the body member in position to hold the said compartment in expanded position when extended and to permit folding of the compartment against the body member when said brace member is swung to position into parallelism with the adjacent wall of the body member.

10. Tank structure comprising a flexible body member having vertical walls, a framework disposed above said walls and supporting the same, vertically-extending bars disposed exteriorly of the body portion, for supporting said framework in elevated position, and a gore-like extension on one of said walls for permitting portions of said wall at each side of one of said vertical bars to be moved to horizontal position to drain the tank.

11. Tank structure comprising a flexible body member having an opening through one wall adjacent to the upper edge thereof, and a flexible conduit connected to the tank body and communicating with said opening to serve as an overflow drain passage.

12. Tank structure comprising a flexible body member having an overflow opening, a compartment attached to said body member and receiving the water discharged from said opening, and a drain pipe connected to said compartment adjacent to the bottom portion thereof.

13. A portable swimming pool comprising a fabric bag and a knock-down frame supporting the bag, means for attaching the bag to the frame at the top, said frame consisting of uprights in the form of separate triangular trusses, tie rods separably connecting the opposite trusses at the bottom in pairs, and a top ring removably secured to the trusses at the top.

14. A portable swimming pool comprising a fabric bag and a knock-down frame supporting the bag, means for attaching the bag to the frame at the top, said frame comprising uprights in the form of separate trusses adapted to be arranged in pairs of opposite trusses, tie rods, one separably connecting each of the two opposite trusses at the bottom, and a top ring formed in sections separably connecting the uprights at the top.

In testimony whereof I the said JOHN H. PHILLIPS have hereunto set my hand.

JOHN H. PHILLIPS.